W. W. MACFARREN.
AUTOMOBILE AXLE.
APPLICATION FILED APR. 30, 1914.
1,160,304.
Patented Nov. 16, 1915.
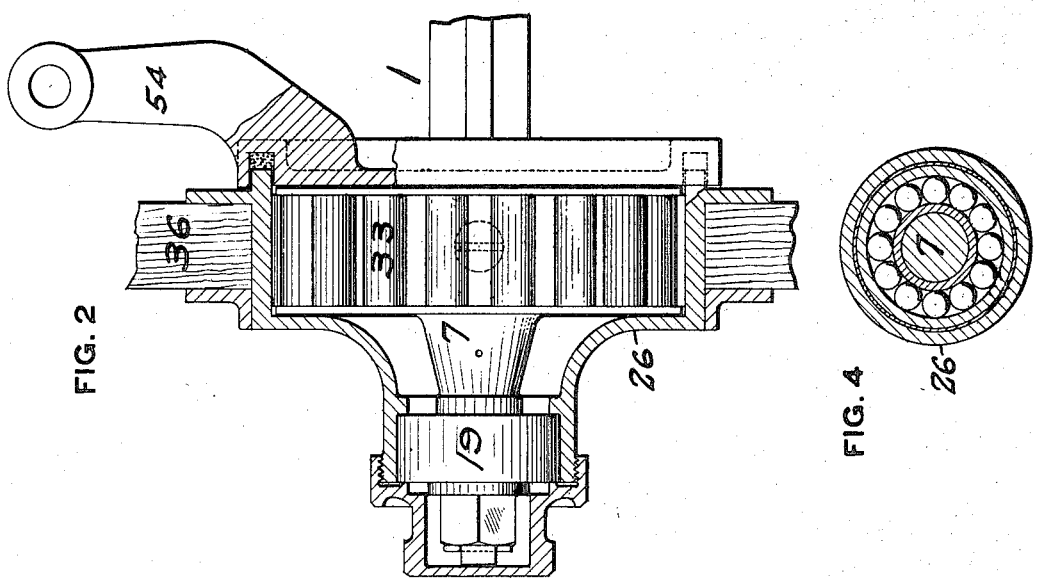
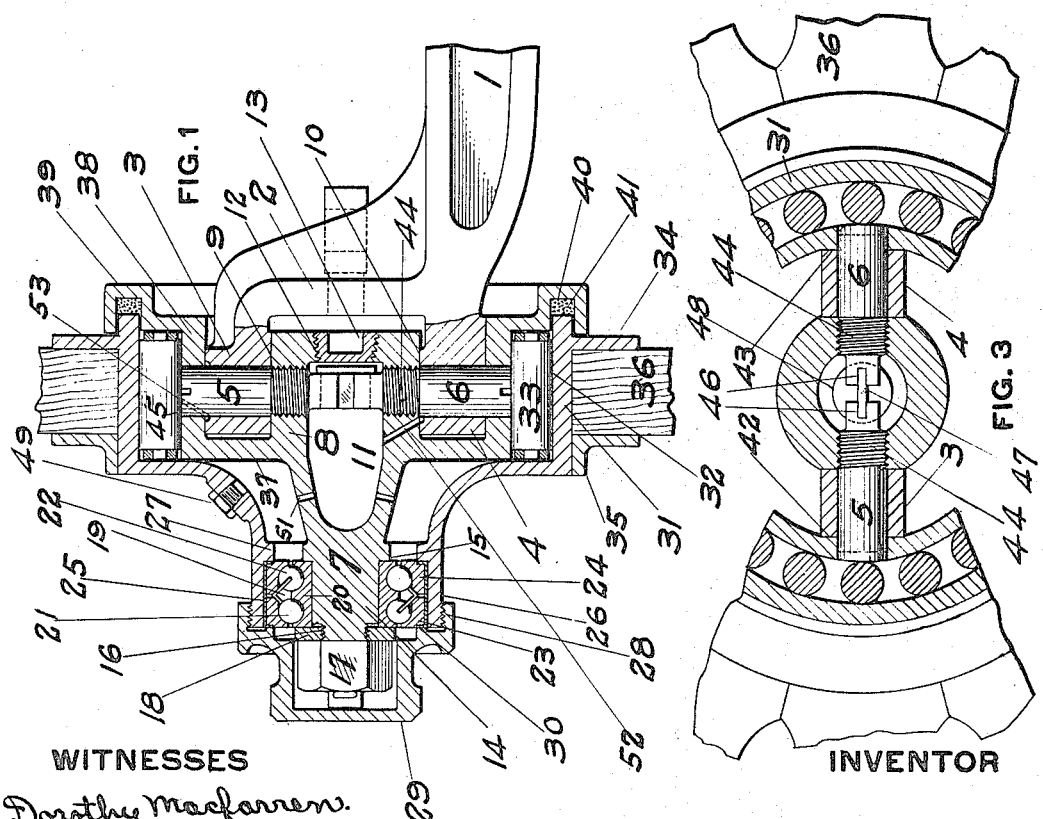
WITNESSES
INVENTOR

UNITED STATES PATENT OFFICE.

WALTER W. MACFARREN, OF PITTSBURGH, PENNSYLVANIA, ASSIGNOR, BY MESNE ASSIGNMENTS, TO MICHAEL MURRAY, OF MOUNT SAVAGE, MARYLAND.

AUTOMOBILE-AXLE.

1,160,304. Specification of Letters Patent. Patented Nov. 16, 1915.

Application filed April 30, 1914. Serial No. 835,462.

*To all whom it may concern:*

Be it known that I, WALTER W. MACFARREN, a citizen of the United States, residing at Pittsburgh, in the county of Allegheny, State of Pennsylvania, have invented certain new and useful Improvements in Automobile-Axles, of which the following is a specification.

My invention relates to steering axles for automobiles and more particularly to that class of axles in which the steering pivots are located in the central vertical plane of the wheel.

Such constructions are not broadly new and the objects of my invention are therefore to improve the arrangement of the bearings, the details of the steering pivots, and to provide means for applying and retaining lubricant and other features more specifically pointed out hereinafter.

In the drawings Figure 1 is a sectional elevation through a wheel hub and one end of my improved axle in the plane of the axle; Fig. 2 is a sectional plan view of the same; Fig. 3 is a transverse vertical section through the steering pivots in the plane of the wheel, and Fig. 4 is a transverse section through the thrust bearing.

Referring to the drawings the axle 1 is provided with a fork 2 at each of its ends. Only one end of the axle need be described as both ends are alike. The fork 2 is provided with upper and lower bosses 3 and 4 within which are formed bearings for the steering pivots 5 and 6, by means of which the stub axle 7 is secured to the main axle 1. The stub axle 7 is provided with a central hub 8 which is flattened at 9 and 10 to fit between the bosses 3 and 4. The hub 8 contains a chamber 11 the inner end of which has an opening 12 which is threaded to receive a screwed plug 13.

Beyond the chamber 11 the axle 7 is reduced to form a shank 14 provided with a shoulder 15. At the outer end of the shank 14 there is formed a screw 16 provided with with a nut 17 and a washer 18. Mounted on the shank 14 and clamped between the shoulder 15 and the washer 18 there is a ball-bearing 19 adapted to take either radial or endwise load. This bearing consists of an inner race 20 having parallel grooves for two sets of balls 21 and 22. An outer race 23 engages the balls 21 and a second outer race 24 engages the balls 22 these outer races taking the thrust of the wheel to left and right respectively.

All parts of the above bearing are contained within a soft steel jacket 25 spun over the races 23 and 24. The wheel hub 26 is bored to fit over the jacket 25 and provided with an internal shoulder 27, and external screw threads 28. A hub cap 29 is mounted on the threads 28 and provided with an annular raised portion 30 which bears against the bearing jacket 25 and clamps it against the shoulder 27. The inner end of the hub 26 is enlarged to form a ring 31 within which a bore 32 is formed for the main bearing 33.

Tight and loose flanges 34 and 35 are formed outside the ring 31 to secure the spokes 36. Outside of the hub 8 there is formed a web 37 which supports an integral ring 38 the outside of which is turned to a smooth surface to engage the main bearing 33. The bearing 33 is here shown as a roller bearing with straight rollers this form of anti-friction bearing giving the greatest carrying capacity with the least diameter but any other desired form of bearing, such as, one provided with balls or coned rollers, or even a plain bearing may be used.

The stub axle 7 is provided with a U shaped extension 39 to the ring 38 forming an annular groove 40 within which a felt ring 41 is placed the same contacting lightly with the projecting edge of the ring 31. Flat spots 42 and 43 are formed within the ring 38 to engage the bosses 3 and 4.

The steering pivots 5 and 6 are provided with threaded ends 44 which are screwed into the hub 8 the outer ends 45 of the pins 5 and 6 being turned to the contour of the ring 38. Both threads 44 are right hand. The inner ends of the pivots 5 and 6 are reduced in diameter and provided with slots 46. When the pivots 5 and 6 are screwed into place the slots 46 are brought into line and a locking piece 47 is passed through the opening 12 to engage the slots. A flange 48 prevents the piece 47 from passing through the slots 46 and the plug 13 prevents the locking piece 47 from coming out of the slots. An oil cup 49 supplies oil to the interior of hub 26 through a hole 50 thus lubricating the bearings 19 and 33. Part of the oil passes through holes 51 into the chamber 11 and thence through a hole 52 to lubricate the lower pivot 6 and the upper face of the boss 4. The pin 5 and the upper face of boss 3 are oiled through a hole 53 by oil carried up by the rollers of bearing 33. The face 9 is lubricated by oil passing down past the pivot 5.

It will be noted that since the pivots 5 and 6 are in the central place of the wheel inequalities or obstacles in the road have practically no effect on the steering, thus no shocks are present to fatigue the driver. The construction is also much safer than the usual overhung stub axle. The main bearing 33 takes all the weight on the wheel and the outer bearing 19 takes only the eccentric radial loads (those due to side strains) and the thrust load. It will be obvious that instead of a combined radial and thrust bearing 19 as shown, separate bearings for radial and thrust loads placed side by side might replace it. Steering is effected by any suitable mechanism connected to the levers 54.

The construction shown is safe, easy to steer and dust proof.

Various modifications may be made by those skilled in the art without departing from the scope of my invention as covered by the following claims.

I claim:

1. In a vehicle, the combination of an axle, a wheel provided with a hub having a large recess in the plane of the spokes and a contracted recess extending outside of said plane, a wheel journal hinged to the axle, cylindrical roller bearings between said journal and hub substantially in the plane of the spokes and contacting directly with the inner face of the hub and the outer face of the journal, a ball race in the contracted outer portion of the hub and bearing against an internal shoulder therein, a cap secured to the hub and closing the outer end thereof and clamping said ball race against said internal shoulder, a ball race fitting on the outer end of the journal against an external shoulder thereon, a collar secured to the journal and clamping said ball race against said external shoulder, said ball races being one within the other and having their coöperating faces substantially parallel to the axis of the wheel and provided with registering semi-circular ball receiving grooves, and balls in said grooves.

2. In a vehicle, the combination of an axle, a wheel provided with a hub, a wheel journal, trunnions connecting said journal and axle, said trunnions having a threaded connection in the journal, and means for locking said trunnions against rotation.

3. In a vehicle, the combination of an axle, a wheel provided with a hub, a wheel journal projecting into the hub and having bearing therein and provided on its inner end with a central recess, trunnions connecting the journal to the axle, said trunnions having a threaded connection in the journal and extending into the central recess therein, and means in said central recess for preventing rotation of said trunnions.

4. In a vehicle, the combination of an axle, a wheel provided with a hub, a wheel journal projecting into the hub and having a bearing therein and provided at its inner end with a central recess and with concentric portions provided with alining openings, trunnions fitting into said alining openings, said trunnions having a threaded connection in the journal, and extending into the central recess in said journal, a key arranged to engage the ends of said trunnions and prevent rotation thereof, and a closure for said central recess.

5. In a vehicle, the combination of a forked axle, a hub, a wheel journal hinged to the forks of the axle by oppositely arranged trunnions and projecting into said hub and having bearing therein and provided at its inner end with a centrally closed chamber, said journal and hub providing an oil chamber therebetween, a port in the journal extending from said oil chamber to the chamber in the journal, a port extending from said central chamber to the lower trunnion, a roller bearing surrounding the journal in the plane of the trunnions, and an oil duct extending inwardly through the journal from the roller bearing to the upper trunnion.

In testimony whereof I hereunto affix my signature in the presence of two witnesses.

WALTER W. MACFARREN.

Witnesses:
J. I. KLINE,
L. McKITRICK.